US010871855B2

(12) United States Patent
De Araujo et al.

(10) Patent No.: US 10,871,855 B2
(45) Date of Patent: *Dec. 22, 2020

(54) AREA FILTERING FOR LOW-LATENCY AND HIGH-LATENCY INPUT EVENT PATHS FROM A SINGLE TOUCH SENSOR

(71) Applicant: Tactual Labs Co., New York, NY (US)

(72) Inventors: Bruno Rodrigues De Araujo, Toronto (CA); Ricardo Jorge Jota Costa, Toronto (CA); Clifton Forlines, Cape Elizabeth, ME (US); Steven Leonard Sanders, New York, NY (US)

(73) Assignee: Tactual Labs Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,145

(22) Filed: Mar. 25, 2019

(65) Prior Publication Data

US 2019/0220145 A1 Jul. 18, 2019

Related U.S. Application Data

(63) Continuation of application No. 15/422,917, filed on Feb. 2, 2017, now Pat. No. 10,241,620.

(60) Provisional application No. 62/290,352, filed on Feb. 2, 2016.

(51) Int. Cl.
*G06F 3/041* (2006.01)
*G06F 3/0488* (2013.01)

(52) U.S. Cl.
CPC .......... *G06F 3/0418* (2013.01); *G06F 3/0416* (2013.01); *G06F 3/0488* (2013.01)

(58) Field of Classification Search
CPC .... G06F 3/0416; G06F 3/0418; G06F 3/0488; G06F 9/451; G06F 1/3262; G09G 5/08
See application file for complete search history.

(56) References Cited

U.S. PATENT DOCUMENTS

| | | | | |
|---|---|---|---|---|
| 2013/0265243 A1* | 10/2013 | Law | ..................... | G06F 1/3262 345/173 |
| 2014/0139456 A1* | 5/2014 | Wigdor | ................... | G06F 9/451 345/173 |
| 2014/0143692 A1* | 5/2014 | Wigdor | ................ | G06F 3/0488 715/764 |

(Continued)

*Primary Examiner* — Richard J Hong
(74) *Attorney, Agent, or Firm* — Adam Landa (57) ABSTRACT

In an embodiment, a touch surface, such as a GUI is graphically divided into two or more input regions, and based on this division, input event paths from a single sensor can be integrated within an operating system to provide application developers with the ability to easily and effectively filter there-between. The graphical division allows an application developer to specify which elements of a given GUI take one path, versus another. In an embodiment, low-latency and high-latency event paths are provided; an algorithm takes into consideration input regions and, based on those regions, handles the low- and high-latency input event paths in a computer system, directing the appropriate inputs through the appropriate processing, and directing the output to the appropriate process or queue without creating constraints on the low-latency event processing due to the presence of higher-latency event paths for a given sensor.

20 Claims, 5 Drawing Sheets

(56) References Cited

U.S. PATENT DOCUMENTS

2015/0002406 A1* 1/2015 Small .................... G06F 3/0488
                                                    345/173
2015/0084908 A1* 3/2015 Jordan .................... G09G 5/08
                                                    345/174
2015/0123945 A1* 5/2015 Lu ........................ G06F 3/0488
                                                    345/175

* cited by examiner

AREA FILTERING FOR LOW-LATENCY AND HIGH-LATENCY INPUT EVENT PATHS FROM A SINGLE TOUCH SENSOR

CROSS-REFERENCE TO RELATED APPLICATIONS

This application is a continuation of U.S. patent application Ser. No. 15/422,917 filed Feb. 2, 2017, which claims priority to U.S. Provisional Patent Application No. 62/290,352 filed Feb. 2, 2016, the entire disclosure of each of which is incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of user input, and in particular to user input systems and methods which use area filtering from a single touch sensor to provide a plurality of input event paths, each having different latencies from one-another.

BRIEF DESCRIPTION OF THE DRAWINGS

The foregoing and other objects, features, and advantages of the invention will be apparent from the following more particular description of preferred embodiments as illustrated in the accompanying drawing(s), in which reference characters refer to the same parts throughout the various views. The drawing(s) are not necessarily to scale, emphasis instead being placed upon illustrating principles of the invention.

DETAILED DESCRIPTION

Any computer system that offers support for touch input requires a mechanism in which a touch is properly directed to the algorithmic process that is responsible for handling the received touch events. In an embodiment, the mechanism works by defining input regions of interest that are associated with the operating system or application software process responsible for handling the "hit" or touched area of a given GUI segment. In an embodiment, a computer system that offers support for event paths from a single sensor with two or more levels of processing and feedback latency similarly requires a mechanism to direct events to software responsible for handling sections of the input region. If a system includes such low-latency and high-latency event paths for a single sensor, the events need to be managed at a certain level in the software stack. In an embodiment, the integration of these different event-paths offering different levels of latency from a single sensor to provide a user or users with a holistic, seamless matched response to their sensed input is left to the application or to the underlying operating system. The perceived seamless integration of low- and high-latency input events from a single sensor and their software-defined feedback has impact on the performance of a whole computer system and allows a computer system to capitalize upon both event paths from the perspective of optimizing user-perceived system latency.

Various approaches to integrating low- and high-latency input event paths from a single sensor at the operating-system-level require downgrading the frequency of low-latency events to present a common abstraction to application developers, for example by reducing/simplifying the high frequency event path to a lower number of events per unit of time. Such approaches in many respects defeat the purpose of dividing a single sensor's raw event stream into event paths with lower and higher latencies. In some approaches, application developers are provided with access to both low- and high-latency event paths from a single sensor. These approaches require that the developers discriminate between events and to address possible spatial collisions due to redundancies, thus potentially creating overhead in application development and/or computational overhead in the application.

Figure 1:
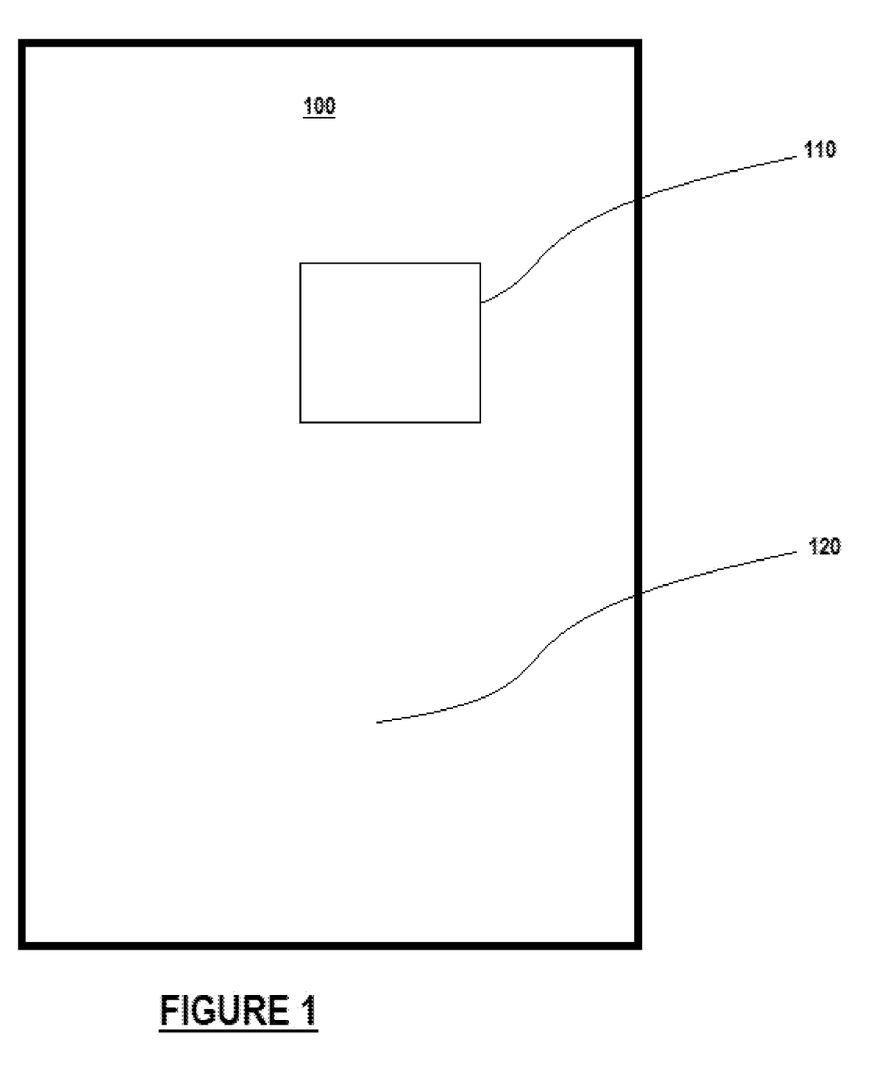
FIG. 1 shows an illustrative GUI graphically divided into a low-latency input region and a high-latency input region.

Turning first to FIG. 1, a GUI 100 is shown. In an embodiment, GUI 100 is graphically divided into a low-latency input region 110 and high-latency input region 120. In an embodiment, based on this division, low- and high-latency input event paths from a single sensor can be integrated within an operating system to provide application developers with the ability to easily and effectively filter there-between. This simple but powerful division allows an application developer to specify which elements of a given GUI have low- and high-latency event paths with a significant level of nuance and control. According to an embodiment, an algorithm takes into consideration input regions and, based on those regions, handles all of the low- and high-latency input event paths in a computer system. Implementing low- and high-latency event paths based on graphical regions provides a common developer solution, and appropriate description of these input regions and behaviors will not constrain the low-latency event processing due to the presence of higher-latency event paths for a given sensor.

Figure 2:
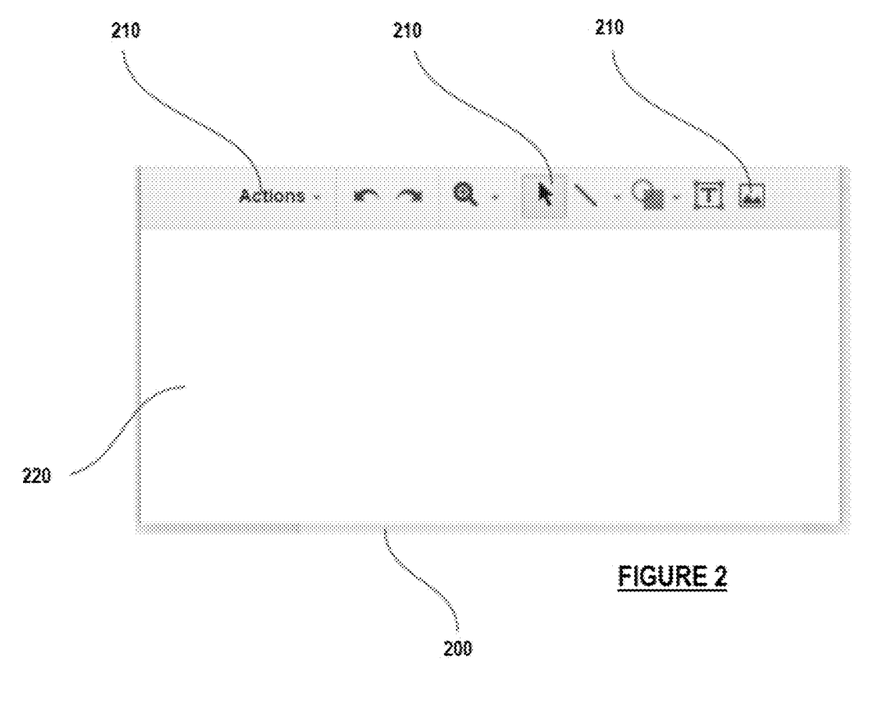
FIG. 2 shows an illustrative application running in a window of a GUI.

Turning briefly to FIG. 2, an illustrative application is shown in a window 200 of a GUI. The window 200 has several components that act as buttons and/or other control elements 210. The window 200 also has a region for drawing 220. In an embodiment, the application defines (e.g., to an operating system) the regions occupied by the control elements 210 as high-latency and the region for drawing 220 as low-latency. Once having defined the regions, the application may thereafter receive input events for the control elements 210 through one channel, while receiving input events for the drawing region 220 through another channel. In an embodiment, the operating system may process the events differently, and through different paths. In an embodiment, the drawing region 220 will receive low-latency events from the system permitting, e.g., rapid rendering of ink strokes on the screen. In an embodiment, the control elements 210 with receive ordinary-latency events from the system, e.g., through the traditional operating system channel for event processing. In an embodiment, the low-latency events may be processed by a GPU while the high- or ordinary-latency events are processed by a CPU. Thus, in an embodiment, the drawing region 220 can render ink strokes at lower latency, and thus, more realistically and/or with more nuance and/or with better control, while the control elements 210 can respond at a higher latency, but still within expected operating parameters.

In an embodiment, the two event streams originating from a single sensor may not only have different latencies, but also may have other qualities that differ. For example, many input sensors operate at high-frequencies and generate many events per second (e.g. 120 events per second). As disclosed in the co-pending application published as US20150302554A1 and entitled DECIMATION STRATEGIES FOR INPUT EVENT PROCESSING (the entire specification of which is incorporated herein by this reference), at some stage in the input processing pipeline, the event stream may be sub-sampled or otherwise aggregated into an event stream with a lower number of events per second (e.g., from 120 to 60 events per second). Other processing may be performed adding additional latency: e.g., processes such as hit testing in software (as disclosed in the co-pending application published as US20160188303A1 and entitled SYSTEM AND METHOD FOR PERFORMING HIT TESTING IN A GRAPHICAL USER INTERFACE (the entire specification of which is incorporated herein by this reference), shape recognition of the contact area, queuing of events, copying of events from one portion of a computer memory to another, and such processing as disclosed in the co-pending applications published as US20150220216A1 and entitled LOW-LATENCY VISUAL RESPONSE TO INPUT VIA PRE-GENERATION OF ALTERNATIVE GRAPHICAL REPRESENTATIONS OF APPLICATION ELEMENTS AND INPUT HANDLING ON A GRAPHICAL PROCESSING UNIT (the entire specification of which is incorporated herein by this reference). Such processing steps add latency to the event stream. Absent the two event streams originating from a single sensor, but having, e.g., different latencies and/or different qualities, a great deal of overhead is demanded from applications, such as: managing input from multiple sources and handling interweaved input events from these multiple pathways.

In an illustrative embodiment, an algorithm receives input from a plurality of different event paths of various levels of latency from a single sensor and receives, as input, a set of region descriptors. In an embodiment, the algorithm operates at the operating system level. In an embodiment, there are two different paths, one being low-latency with respect to the other. In an embodiment, there are at least two different paths, one being lowest-latency with respect to the others. In an embodiment, there are at least two different paths, one being highest-latency with respect to the others. In an embodiment, there are at least three different paths, one being the lowest-latency with respect to the others and one being the highest latency with respect to the others. In an embodiment, each of the region descriptors may be associated with a given software process. In an embodiment, one or more of the region descriptors are associated with a "null" processes, and thus, will ignore sensed touch events in that region.

In an embodiment, a database is created to define how event paths behave for each "hit" or each touched region of the GUI. In an embodiment, the database is based, at least in part, on the set of region descriptors. In an embodiment, the database and algorithm serve as a filter for each event path from a single sensor and the event paths are directed according to, and as a result of, the application's specification of the regions. As used herein, the term database is intended to be used in the broadest sense of the term, referring to any kind of data store, including, e.g., variable storage, a table, an array, or more a complex database whether accessible through an interface, or directly.

In an embodiment, all events from the single sensor may be sent to both a high-latency event stream and low-latency event stream. Processing (such as e.g., event aggregation, may, or may not, occur on the events in either of the event streams.) The operating system may make both streams available for an application, such that the application can receive high-latency, potentially aggregated data, and would thereafter be able to inspect low-latency "detail" should that be desirable. An application could use time-stamping or other synchronization techniques to maintain correlation between multiple streams from the single sensor.

In an embodiment, events from the single sensor may be sent to either a high-latency event stream or low-latency event stream, but not to both. Processing (such as e.g., event aggregation, may, or may not, occur on the events in either of the event streams.) In an embodiment, the operating system may make only the region-defined stream available for an application within that region, such that the application can receive the regionally-defined data. Thus, in an exemplary embodiment, an application would receive only the low-latency event path for, e.g., a drawing region defined as low-latency.

In an embodiment, the region descriptors or specifications may be implemented (e.g., as defaults) within the operating system tools or other tools. Thus, for example, an operating system may have a standard latency path for a button control, and another standard lower-latency path for a drawing region. In this manner, an operating system can exploit computing resources (e.g., CPU versus GPU) and still provide for uniform operation across applications implementing similar controls. In an embodiment, the default region descriptors or specifications implemented by an operating system or other tools may be alterable by an application program. In this manner, an operating system can permit an application to specify specific enhanced performance controls. In an embodiment, the operating system can preclude, permit and/or limit such access to the region descriptors or specifications.

In an embodiment, there are two event paths for a single sensor, one with high-latency and one with low-latency, and a single routing process that decides where to assign each event path. The single routing process receives both the high- and low-latency event stream and may access a database that details where (e.g., the operating system process or application software) to route a sensed "hit" or touch based on the event location. The single routing process may further decide whenever a specific event passes therethrough. In an embodiment, there are more than two event paths, and a single routing process that decides where to assign each of the plurality of paths. In an embodiment where there are more than two event paths, a single routing process may receive all the event streams and may access a database that details where (e.g., the operating system process or application software) to route a sensed "hit" or touch based on the event location. In an embodiment where there are more than two event paths, a single routing process may decide whenever a specific event passes there-through.

In an embodiment, there are two event paths for a single sensor, one with high-latency and one with low-latency, and two routing processes, one associated with the low-latency event path and one associated with the high-latency event path. One process is responsible for the low-latency input stream and the other process is responsible for the high-latency input stream. In an embodiment, each process acts as a filter. In an embodiment, each routing process bases it's filtering on a database that details the OS or application software is responsible for regions of the input device. Each filter decides when to stop or to let pass a given event from the low- or high-latency event path for a single sensor. In an embodiment, each process represents an inverted region of the other process.

In an embodiment, there are multiple event paths for a single sensor at least two having differing latency, and a routing process associated with each of the multiple event paths. In an embodiment, each such process acts as a filter. In an embodiment, each such routing process bases it's filtering on a database that details the OS or application software responsible for regions of the input device. Each filter decides when to stop or to let pass a given event from its associated event path for a single sensor. In an embodiment, the regions for the multiple event paths comprise an entire touch-sensitive display. In an embodiment, the regions for the multiple event paths do not comprise an entire touch-sensitive display.

In an embodiment, each routing process associated with an event path has a separate database. In an embodiment, at least two routing process associated with an event path share a common database. In an embodiment, the routing processes access non-intersecting databases. In an embodiment, the routing processes access databases that define disparate regions, without overlap. In an embodiment, the routing processes access databases that define at least two regions that overlap one-another. In an embodiment, only one routing process has access to a database and another routing process operates as a pass through.

In an embodiment, the database used by a routing process reflects input regions that are associated with one or more responsible processes in the OS or applications. In an embodiment, the database used by a routing process reflects input regions that are not associated with one or more responsible processes in the OS or applications. In an embodiment, the database used by a routing process reflects both input regions that are associated with one or more responsible processes in the OS or applications and input regions that are not associated with one or more responsible processes in the OS or applications.

Figure 3:
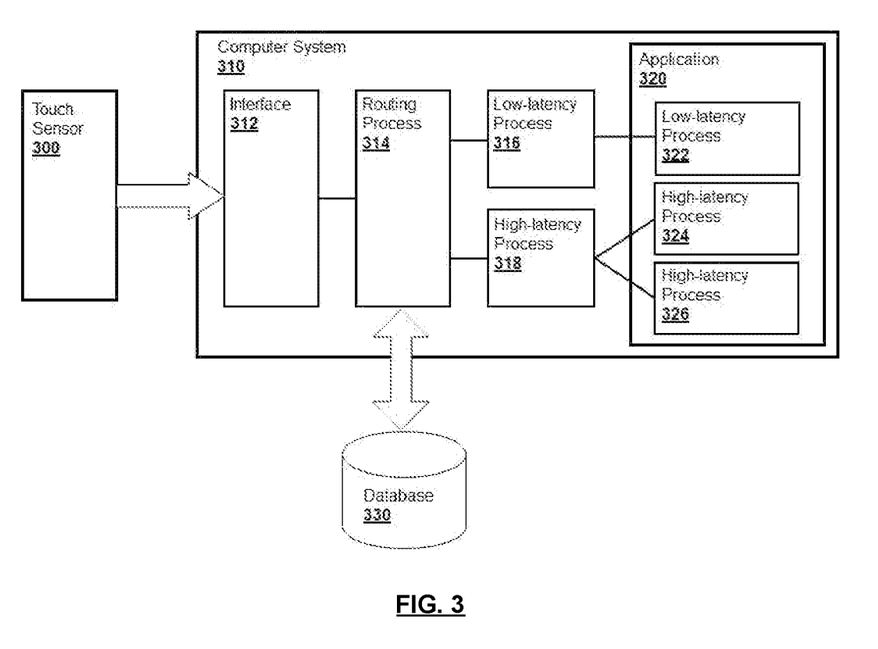
FIG. 3 is a high-level block diagram showing aspects of one embodiment of the invention.

Turning to FIG. 3, a high-level block diagram is shown of an embodiment having two event paths for a single touch sensor 300. The touch sensor 300 is operatively connected to a computer system 310, via an interface 312. A routing process 314 receives touch event data from the interface, and uses a database 330 to determine whether the touch event data is associated with the defined high-latency region or the defined low-latency region. The routing process 314 outputting the touch events from the low-latency region to low-latency process 316, and the events from the high-latency region to high-latency process 318. In an embodiment, low-latency process 316 is serviced on a GPU while high-latency process 318 is serviced on a CPU.

In an embodiment, application 320, running on the computer system 310, comprises one or more low-latency process 322, and one or more high latency processes 324, 326, each of the processes 322, 324, 326 being associated with a different region of the single touch sensor 300 via the database 330. In an embodiment, the region descriptors in the database 330 also associating a desired latency path associate with each of the processes. In an embodiment, the latency path is defined during an OS registration process performed by the application 320. In an embodiment, the latency path is predefined, and associated with the type of OS registration process performed by the application 320, e.g., requesting a button or a drawing canvas. In an embodiment, the latency path is defined by the application 320. In an embodiment, the latency path is defined by an OS running on the computer system 310.

In operation, when a touch event occurs on the single touch sensor 300, that information is detected via interface 312. The detected touch is passed to the single routing process 314, which, in an embodiment, selectively delivers provides the touch to a low-latency process 316 or a high-latency 318 process. In an embodiment, the low-latency process 316 comprises no processing on the touch information, and simply delivers (or queues) the touch data to the low-latency application process 322. In an embodiment, the low-latency process 316 filters or otherwise processes the low-latency touch data in a manner appropriate for use by the low-latency application process 322. In an embodiment, the high-latency process 318 filters or otherwise processes the high-latency touch data in a manner appropriate for use by the high-latency application processes 324, 326. In an embodiment, the high-latency process 318 aggregates and/or decimates the high-latency events to provide a smaller number of events to the high-latency processes 324, 326. In an embodiment (not shown), the detected touch may be passed to both the low-latency process 316 and the high-latency 318 process, permitting the application 320 process 322, 324, 326 to access the appropriate latency-related data, or, at the processes election, to access the additional data processed as appropriate for the opposite latency.

Figure 4:
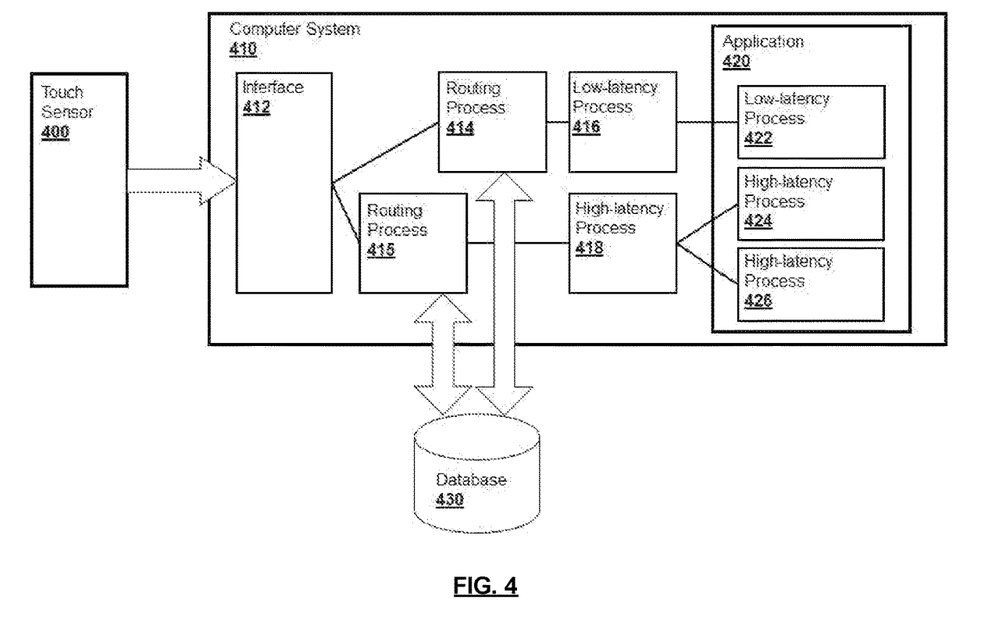
FIG. 4 is a high-level block diagram showing aspects of another embodiment of the invention.

Turning to FIG. 4, a high-level block diagram is shown of an embodiment having two event paths for a single touch sensor 400. The touch sensor 400 is operatively connected to a computer system 410, via an interface 412. Routing processes 414, 415 receive touch event data from the interface, and use a database 430 to determine whether the touch event data is associated with the defined high-latency region or the defined low-latency region. Routing processes 414 outputting the touch events from the low-latency region to low-latency process 416, and routing processes 415 outputting the events from the high-latency region to high-latency process 418. In an embodiment, low-latency process 416 is serviced on a GPU while high-latency process 418 is serviced on a CPU.

In an embodiment, application 420, running on the computer system 410, comprises one or more low-latency process 422, and one or more high latency processes 424, 426, each of the processes 422, 424, 426 being associated with a different region of the single touch sensor 400 via the database 430. In an embodiment, the region descriptors in the database 430 also associating a desired latency path associate with each of the processes. In an embodiment, the latency path is defined during an OS registration process performed by the application 420. In an embodiment, the latency path is predefined, and associated with the type of OS registration process performed by the application 420, e.g., requesting a button or a drawing canvas. In an embodiment, the latency path is defined by the application 420. In an embodiment, the latency path is defined by an OS running on the computer system 410.

Although FIG. 4 shows the routing processes 414, 415 sharing a common database 430, in an embodiment, each of the routing processes 414, 415 could have its own database (not shown.)

In operation, when a touch event occurs on the single touch sensor 400, that information is detected via interface 412. The detected touch is passed to the routing processes 414, 415, each of which act as a filter, selectively delivering the touch to a latency latency-appropriate process 416, 418. In an embodiment, the low-latency process 416 comprises no processing on the touch information, and simply delivers (or queues) the touch data to the low-latency application process 422. In an embodiment, the low-latency process 416 filters or otherwise processes the low-latency touch data in a manner appropriate for use by the low-latency application process 422. In an embodiment, the high-latency process 418 filters or otherwise processes the high-latency touch data in a manner appropriate for use by the high-latency application processes 424, 426. In an embodiment, the high-latency process 418 aggregates and/or decimates the high-latency events to provide a smaller number of events to the high-latency processes 424, 426. In an embodiment (not shown), the detected touch may be passed to both the low-latency process 416 and the high-latency 418 process, permitting the application 420 process 422, 424, 426 to access the appropriate latency-related data, or, at the processes election, to access the additional data processed as appropriate for the opposite latency.

Figure 5:
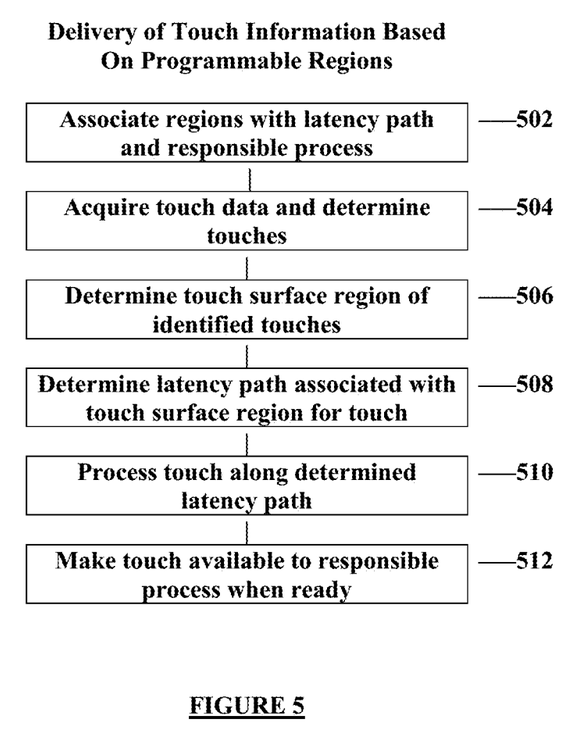
FIG. 5 is a high level flow diagram illustrating a method for the delivery of touch information based on programmable regions.

Turning now to FIG. 5, a high level flow diagram provides steps for the delivery of touch information based on programmable regions. At Step 502, touch regions are associated with a latency path and a responsible process. In an embodiment, an application program may register a process to receive touch data over a specific latency path. In an embodiment, an application program may request a tool or control that implicitly creates the association. In an embodiment, a database is created that associates responsible processes with regions and latency paths; such a database may be predefined, or may be created (e.g., by an application or an operating system at runtime). In an embodiment, associations may be revised and/or modified depending on operational factors. In an embodiment, modifications may be made by the computing system or operating system for a variety of reasons, including, for resource management, thus, associations requested e.g., by an application program need not be honored.

At Step 504, touch data is acquired. In an embodiment, an entire frame of touch data is acquired representing touch across the entire touch surface, which may be a touch screen. In an embodiment, orthogonal signals drive all or substantially all of the rows simultaneously, and all or substantially all of the columns are interrogated for touch simultaneously, providing data for the entire touch surface in a single frame.

At Step 506, the touch data is inspected and processed for touch coordinates, and the screen region associated with each touch is determined. In an embodiment, at this Step 506, reference may be made to the database, or another repository of touch region information to associate the touch coordinates, and thus touches, with a touch region.

At Step 508, the database or another source of information is again consulted to associate each touch with a latency path. Once the latency path is determined, at Step 510, touch information is sent for processing on the latency path associated with that touch. In an embodiment, touch information is sent for processing on one or more additional latency paths. In an embodiment, touch information is sent for processing on all available latency paths.

Finally, at Step 512, the touch is made available to the responsible process. In an embodiment, the touch is queued in a stream or other repository of information for access by the responsible process. In an embodiment, the touch is delivered by a message or other process designed to deliver the touch data to the responsible process.

As discussed and described above, this specification is directed at providing multiple latency paths for a touch surface which paths are enabled, or made accessible, on a per-region basis. The touch surfaces discussed and described herein include any computer system that offers support for touch input. Without intending to limit the generality of the foregoing sentence in any manner, a computer system that offers support for touch input may include a touch-screen mobile telephone, a tablet, a "phablet", a touch-screen computer, a touch-screen monitor, an interactive touch-screen computing device, a touch-enabled white board, a touch-enabled switch or surface, a touch-enabled object such as a mouse, a controller, a wheel, an instrument, a ball or a grip.

While the invention has been particularly shown and described with reference to a preferred embodiment thereof, it will be understood by those skilled in the art that various changes in form and details may be made therein without departing from the spirit and scope of the invention.

The invention claimed is:

1. A device, comprising:
a computer system comprising a low-latency path for touch data and at least one other latency path for touch data;
a sensor operatively connected to an interface of the computer system, wherein the interface of the computer system is configured to receive touch-related information from the sensor, and to output touch data; and
a routing process configured to receive the touch data from the interface, and to route the touch data matching a region descriptor to the low-latency path for touch data.

2. The device of claim 1, wherein the low-latency path is predefined.

3. The device of claim 1, wherein the low-latency path is associated with a region descriptor.

4. The device of claim 1, wherein the low-latency path is defined during an OS registration process performed by an application.

5. The device of claim 1, wherein the low-latency path is predefined, and associated with an OS registration process performed by an application.

6. The device of claim 1, wherein the low-latency path is defined by an application.

7. The device of claim 1, wherein the low-latency path is defined by an OS running on the computer system.

8. The device of claim 1, wherein touch data routed to at least one other latency path is further processed along with other touch data routed to the at least one other latency path.

9. The device of claim 1, wherein touch data routed to at least one other latency path is decimated to provide a smaller number of events to a recipient of the at least one other latency processes.

10. The device of claim 1, wherein touch data routed to at least one other latency path is aggregated to provide a smaller number of events to a recipient of the at least one other latency processes.

11. A method of managing data from a sensor, the method comprising:
identifying a first region on a sensor based on a region descriptor, the first region comprising less than the entire sensor;
providing a low-latency path for processing data;
receiving input information from the sensor;
identifying at least one event from the input information;
determining whether the event is associated with the first region; and
routing the event to a low-latency touch path if the event is associated with the first region.

12. The method of claim 11, wherein the low-latency path is predefined.

13. The method of claim 11, wherein the low-latency path is associated with a region descriptor.

14. The method of claim 11, wherein the low-latency path is defined during an OS registration process performed by an application.

15. The method of claim 11, wherein the low-latency path is predefined, and associated with an OS registration process performed by an application.

16. The method of claim 11, wherein the low-latency path is defined by an application.

17. The method of claim 11, wherein the low-latency path is defined by an OS running on the computer system.

18. A method of managing touch data from a sensor adapted to route a touch event to a low-latency touch path for processing touch data if the touch event is associated with a low-latency region and routing the touch event to another latency touch path different from the low-latency touch path for processing touch data if the touch event is associated with a second region different than the low-latency region, the method comprising:
- defining at least two regions on the sensor based on at least one region descriptor such that there are defined at least the low-latency region and the second region;
- providing a low-latency path for processing touch data from the low-latency region;
- receiving touch-related information from the sensor;
- identifying at least one touch event from the touch-related information;
- routing the touch event to the low-latency touch path for processing touch data if the touch event is associated with the low-latency region.

19. The method of claim 18, wherein the low-latency path is predefined.

20. The method of claim 18, wherein the low-latency path is defined during an OS registration process performed by an application.

* * * * *